(12) United States Patent
Marchesi et al.

(10) Patent No.: US 11,389,718 B2
(45) Date of Patent: Jul. 19, 2022

(54) GAME SYSTEM

(71) Applicant: LEGO A/S, Billund (DK)

(72) Inventors: Roberto Marchesi, Vejle (DK);
Melissa Jane Pickering, Vejle (DK);
Maiken Hillerup Fogtmann, Vejle (DK); Henrik Munk Storm, Randbøl (DK); Rasmus Harr, Vejle (DK);
Cephas Edgar Howard, Billund (DK)

(73) Assignee: LEGO A/S, Billind (DK)

( * ) Notice: Subject to any disclaimer, the term of this patent is extended or adjusted under 35 U.S.C. 154(b) by 0 days.

(21) Appl. No.: 16/341,742

(22) PCT Filed: Oct. 10, 2017

(86) PCT No.: PCT/EP2017/075730
§ 371 (c)(1),
(2) Date: Apr. 12, 2019

(87) PCT Pub. No.: WO2018/069269
PCT Pub. Date: Apr. 19, 2018

(65) Prior Publication Data
US 2020/0023269 A1 Jan. 23, 2020

(30) Foreign Application Priority Data
Oct. 14, 2016 (DK) .............................. PA201670810

(51) Int. Cl.
*A63F 13/213* (2014.01)
*A63H 33/04* (2006.01)
*A63F 13/92* (2014.01)

(52) U.S. Cl.
CPC ............ *A63F 13/213* (2014.09); *A63F 13/92* (2014.09); *A63H 33/04* (2013.01); *A63H 2200/00* (2013.01)

(58) Field of Classification Search
CPC .... A63F 13/213; A63F 2300/69; A63F 13/92; G06T 19/006; H04N 5/23229; A63H 33/04
See application file for complete search history.

(56) References Cited

U.S. PATENT DOCUMENTS 3,005,282 A   10/1961   Christiansen
D253,711 S   12/1979   Christiansen et al.
(Continued)

FOREIGN PATENT DOCUMENTS

CN   104334238 A   2/2015
EP     1714683 A1  10/2006
(Continued)

OTHER PUBLICATIONS

Search Report and Written Opinion issued in Danish priority patent application No. PA 2016 70810, dated Mar. 31, 2017.
(Continued)

*Primary Examiner* — David L Lewis
*Assistant Examiner* — Robert E Mosser
(74) *Attorney, Agent, or Firm* — Day Pitney LLP; Valeriya Svystun; Anthony A. Kassas (57) ABSTRACT

A game system, comprising: a plurality of game tokens, an image capturing device and a processor; the image capturing device being operable to capture one or more images of one or more event tokens placed within a field of view of the image capturing device, the plurality of game tokens comprising a plurality of event tokens; wherein the processor is configured to: execute a digital game, the digital game comprising computer executable code configured to cause the processor to associate one or more individual game events with each of the plurality of event tokens; and to associate one or more further game events with each of a plurality of sets of event tokens, each set comprising two or
(Continued)

more event tokens chosen from said plurality of event tokens; receive one or more images captured by said image capturing device; recognise one or more game tokens of the plurality of game tokens within the one or more images, the recognised one or more game tokens including one or more event token; responsive to recognising a single event token of the plurality of event tokens in the one or more images, cause the one or more individual game events associated with the recognised event token; responsive to recognising one of the plurality of sets of event tokens in the one or more images, where the event tokens of the recognised set are positioned in a predetermined spatial configuration relative to each other, cause the one or more further game events associated with the recognised set.

17 Claims, 7 Drawing Sheets

(56) References Cited

U.S. PATENT DOCUMENTS

| | | | |
|---|---|---|---|
| 7,690,975 | B2 | 4/2010 | Watanabe et al. |
| 2003/0062675 | A1* | 4/2003 | Noro ............... A63F 3/00895 273/237 |
| 2005/0272502 | A1 | 12/2005 | Marks |
| 2006/0073892 | A1 | 4/2006 | Watanabe et al. |
| 2009/0115133 | A1 | 5/2009 | Kelly et al. |
| 2009/0197658 | A1* | 8/2009 | Polchin ............... A63H 1/30 463/9 |
| 2012/0049453 | A1 | 3/2012 | Morichau-Beauchant et al. |
| 2012/0295703 | A1 | 11/2012 | Reiche et al. |
| 2013/0123009 | A1 | 5/2013 | Maharbiz et al. |
| 2014/0256430 | A1 | 9/2014 | Matsumura |
| 2014/0378023 | A1* | 12/2014 | Muthyala ........... A63H 33/042 446/91 |
| 2018/0018821 | A1* | 1/2018 | Reagan ............ H04N 5/23229 |
| 2020/0094134 | A1* | 3/2020 | Marchesi ........... A63F 13/213 |

FOREIGN PATENT DOCUMENTS

| | | |
|---|---|---|
| EP | 1779907 A1 | 5/2007 |
| EP | 2714222 A1 | 4/2014 |
| EP | 2744580 A1 | 6/2014 |
| EP | 2749327 A1 | 7/2014 |
| EP | 2862604 A1 | 4/2015 |
| WO | 2011017393 A1 | 2/2011 |
| WO | 2012160055 A1 | 11/2012 |
| WO | 2013122798 A1 | 8/2013 |
| WO | 2005113086 A1 | 12/2015 |
| WO | 2016050757 A1 | 4/2016 |

OTHER PUBLICATIONS

International Search Report and Written Opinion issued in corresponding international application No. PCT/EP2017/075730, dated Feb. 19, 2018.

Get sucked into the game!; SickBricks [online]; [retrieved on Mar. 28, 2017 using www.archive.org dated Feb. 14, 2015] Retrieved from the internet <URL: http://webarchive.org/web/20150214155129/ http://sickbricks.com/game-info.php>.

How to Play Sick Bricks: YouTube [online]; [retrieved on Mar. 28, 2017 using www.youtube.com dated Feb. 12, 2015] Retrieved from internet <URL: https://www.youtube.com/watch?v=VFSQuAUFoSU> (Video is unavailable).

International Preliminary Report on Patentability (includes correspondence and amended pages of claims attached thereto), issued in corresponding international application No. PCT/EP2017/075730, dated Jan. 18, 2019.

International Search Report and Written Opinion issued in related international application No. PCT/EP2017/078835, dated Feb. 15, 2018.

International Preliminary Report on Patentability (includes correspondence and amended pages of claims attached thereto), issued in related international application No. PCT/EP2017/078835, dated Mar. 29, 2019.

First Office Action issued in corresponding Chinese Patent Application No. 201780075049.5, dated Jan. 28, 2022, 10 pages (English translation only).

First Office Action issued in corresponding Chinese Patent Application No. 201780081917.0, dated Mar. 14, 2022, 12 pages (English Translation only).

* cited by examiner

GAME SYSTEM

CROSS-REFERENCE TO RELATED APPLICATIONS

This application is a U.S. National Stage of International Application No. PCT/EP2017/075730, filed on 10 Oct. 2017 and published on 19 Apr. 2018, as WO 2018/069269 A1, which claims the benefit of priority to Danish Patent Application No. DK PA201670810, filed on 14 Oct. 2016. The content of each of the above referenced patent applications is incorporated herein by reference in its entirety for any purpose whatsoever.

The present invention relates to the application of computer vision technology for toys-to-life applications and, more particularly, to a game system employing such technology.

BACKGROUND OF THE INVENTION

Different attempts of integrating physical objects into virtual game play have been made. However, it remains desirable to provide ways of linking the physical world and a virtual game play which may stimulate the interactive involvement of the user and provide entertaining game play. Therefore there is a need for a new approach to interactive game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 2014/256430. It would be generally desirable to provide game systems that do not require the toy to comprise elements that are capable of communicating with a reader device so as to be able to identify a toy element, and to create its virtual digital representation and associate it with additional digital data.

WO 2011/017393 describes a system that uses computer vision to detect a toy construction model on a special background. In this prior art system, an assembled model is on a special background plate with a specific pattern printed on it.

EP 2 714 222 describes a toy construction system for augmented reality.

The digital game available under the name LEGO NEXO Knights allows users to scan codes from a collection of scannable codes. The codes represent in-game powers.

In view of this prior art it remains desirable to provide improved game systems that provide additional mechanisms for versatile interactions by the user with the game system.

SUMMARY

In accordance with one aspect, disclosed herein are embodiments of a game system. The game system comprises a plurality of game tokens, an image capturing device and a processor. The image capturing device is operable to capture one or more images of one or more game tokens placed within a field of view of the image capturing device, the plurality of game tokens comprising a plurality of event tokens.

The processor is configured to:

execute a digital game, the digital game comprising computer executable code configured to cause the processor to associate one or more individual game events with each of the plurality of event tokens; and to associate one or more further game events with each of a plurality of sets of game tokens, each set comprising two or more game tokens and each set comprising one or more event tokens chosen from said plurality of event tokens;

receive one or more images captured by said image capturing device;

recognise one or more game tokens of the plurality of game tokens within the one or more images, the recognised one or more game tokens including one or more event token;

responsive to recognising a single event token of the plurality of event tokens in the one or more images, cause the one or more individual game events associated with the recognised single event token;

responsive to recognising one of the plurality of sets of game tokens in the one or more images, where the game tokens of the recognised set are positioned in a predetermined spatial configuration relative to each other, cause the one or more further game events associated with the recognised set.

Hence, the game system allows the user to interact with the digital game by presenting game tokens to the game system such that the image capturing device captures one or more images of the game token or tokens and the processor recognises the game token(s). The game tokens include event tokens, and the game system causes a game event in the digital game responsive to the recognition of the event token(s).

As the game system associates further game events with sets of multiple game tokens, the user may trigger additional events by presenting these sets of multiple game tokens to the game system rather than being limited to presenting individual, single game tokens. Each set of game tokens is defined by its members, i.e. by the game tokens making up the set. Moreover, each set of game tokens is a subset of the plurality of game tokens such that the set includes two or more game tokens among which there is at least one event token of the set of event tokens. Responsive to recognising one of the plurality of sets of game tokens in the one or more images, where the game tokens of the recognised set are positioned in a predetermined spatial configuration relative to each other, the processor may be configured to cause the one or more further game events associated with the recognised set in addition to, or instead of, the individual game event(s) associated with the individual one or more event tokens of the recognised set, i.e. the further game event associated with a set of game tokens is different from the individual game events associated with the individual event tokens that are included in the set.

When a set of game tokens triggers the further game event only when the game tokens of the set are presented to the game system in a predetermined spatial configuration, e.g. in a predetermined geometric pattern, the game interaction is made more predictable, as the risk is reduced that the user inadvertently triggers one of the further game events even if the user intended to trigger an individual game event instead. For example, the user may have a large number of game tokens spread out on a table and the user may intend to capture an image of one of the event tokens. In such a situation the user may inadvertently include other game tokens in the same image which may lead to undesired results. However, as it is less likely that the user has inadvertently positioned multiple game tokens that belong to one of the sets in the required spatial configuration on the table, the risk of an inadvertent triggering of undesired game events is reduced. Accordingly, the risk for frustrating game experience is reduced. Nevertheless, the number of game events that may be triggered by a limited number of different event tokens is increased, as the event tokens can be combined with each other and/or with other game tokens in many different ways so as to form different sets.

In some embodiments, only one or more predetermined sets of game tokens trigger further game events while sets other than the predetermined sets of game tokens have no further game event associated with them. In other embodiments, any set of two or more game tokens that include at least one event token, or at least any set having a predetermined number of members or having a predetermined minimum number of members may trigger a further game event as long as they are positioned in the predetermined spatial configuration relative to each other.

In some embodiments, the processor is further configured, responsive to recognising two or more event tokens of the plurality of event tokens in the one or more images, where the recognised two or more event tokens are different from the plurality of sets of game tokens—i.e. where the two or more event tokens do not form any of said sets of game tokens that have a further game event associated with it—or where the recognised two or more event tokens are positioned in another spatial configuration relative to each other, different from said predetermined spatial configuration, to cause the one or more individual game events associated with the two or more recognised event tokens without causing any of the further game events. Accordingly, the user may choose to present multiple tokens to the game system simultaneously, without having to invoke the further game events but simply in order to simultaneously trigger the individual game events associated with the individual tokens. By selectively either presenting the event tokens in the predetermined spatial configuration or in a different spatial configuration, the user can control which game events are to be triggered in the digital game.

Each event token represents one or more individual game event associated with that particular event token. Recognition of the event tokens may trigger a variety of game events, such as unlocking of game characters, causing game characters to perform certain actions, the spawning of characters or objects, etc. Generally, the game events may comprise making a game asset available in the digital game, e.g. a virtual character, a virtual object, a capability of a character or an object, an accessory for use by a character, an evolution of a character, an increased capability, an increased health value, etc. Accordingly, in some embodiments, each event token is indicative of an individual game asset, and each individual game event associated with an event token comprises making the individual game asset associated with said event token available in the digital game. In such embodiments, a further game event associated with a set of game tokens may thus comprise making another game asset available in the digital game, the another game asset being different from an accumulation of the individual game assets associated with the one or more event tokens of the set of game tokens.

Generally, a further game event associated with one of the sets of two or more event tokens is different from a mere accumulation of the individual game events that are associated with the individual event tokens of the set, i.e. the effect of the further game event occurring in the digital game is different from the effect of the individual game events occurring concurrently in the digital game. For example the further game event may be different in nature from the individual game events. In one specific embodiment, each individual game event associated with an event token of a set may make a capability, e.g. a strength, a power, a specific attack move, or the like, available which may be assigned to a virtual character of the game. The further game event associated with the set, on the other hand, may make an accessory such as a weapon, a piece of armour, a vehicle, or the like available. In other embodiments, the further game event may be similar in nature to the individual game events but provide an event in the digital game that goes beyond a mere accumulation of the effects of the individual game events. For example, when the individual game events each make a corresponding capability available that can be assigned to a virtual character, the further game event may make another capability available different from the individual capabilities and different from a mere accumulation of the individual capabilities.

As described above, a game event may comprise making a game asset available in the digital game. Making a game asset available may further comprise automatically assigning the asset to one or more virtual characters. For example, the game asset may, responsive to the recognition of the corresponding event token or the corresponding set, be automatically be assigned to the player character currently being controlled by the user. In other examples, each game asset may specifically be associated with a specific virtual game item or with a specific group of virtual game items. Accordingly, responsive to the recognition of the corresponding event token or the corresponding set of game tokens, a game asset may automatically be assigned to the specific virtual game item or group of virtual game items.

In other embodiments, making a game asset available may not automatically assign or activate the game asset but merely make the game asset available to the player such that the player can subsequently assign or activate the game asset. To this end, the game event may create a representation of the game asset and add the game asset to a collection of available game assets. In other embodiments, making a game asset available may automatically assign the game asset to a specific virtual game item or group of virtual game items, but it may not automatically activate the game asset but merely make the game asset available to the player such that the player can subsequently activate the game asset, but only in association with the specific virtual game item or group of virtual game items.

In some embodiments, the association of an individual game event with an event token may be predetermined and static, i.e. the association may not change during the course of the game. In other embodiments, the association may not be static and/or the association may not be predetermined. For example, during the course of the game, the individual game event associated with an event token may change, e.g. based on a user input or another game event. When the association is not predetermined, the event token may initially not be associated to any game event. For example, once recognised for the first time, a game event may be assigned to the event token, e.g. a user-selected game event may be assigned to the event token. Once assigned, the association may be static or it may subsequently be changed again.

Many types of digital game play can be enhanced by recognising event tokens including, but not limited to, nurture-games, battle type games (player vs. player or player vs. computer), racing games, and role playing action/resource games, virtual construction games, massive multi-player online games, strategy games, augmented reality games, games on mobile devices, etc. In some embodiments the digital game comprises computer executable code configured to cause the processor to control at least one virtual game item. Examples of virtual game items include virtual characters, such as a virtual player character that is controlled by the game system in direct response to user inputs, or a non-player character that is controlled by the game system based on the rules of the game. An item token associated with a virtual character will also be referred to as a character token. Other examples of virtual game items include virtual objects such as inanimate objects, accessories that can be used by virtual characters, e.g. weapons, vehicles, clothing, armour, food, in-game currency or other types of in-game resources, etc.

In some embodiments, the plurality of game tokens further comprises an item token representing a first virtual game item of the at least one virtual game item; and the processor is further configured to recognise the item token in the captured one or more images. The computer executable code of the digital game may further be configured to cause the processor to associate a first further game event with a first set of game tokens, the first set comprising the item token and one or more event tokens. The first further game event may comprise associating one or more game event associated with the one or more event tokens of the first set with the first virtual game item of the first set. Generally a set of game tokens having a further game event associated with it may comprise only event tokens or one or more item tokens and one or more event tokens.

In some embodiments, when the event tokens of the first set of game tokens are recognised by the processor as positioned in said predetermined spatial configuration relative to each other and relative to the item token of the first set, the processor is configured to associate one or more game events associated with the event tokens of the first set with the first virtual game item. Hence, in these embodiments, the user may easily and intuitively control which virtual game item a game event is to be associated with. For example, when the game event associated with an event token of the first set involves making a game asset available in the digital game, the game asset may automatically be associated with a virtual game item that is identified by the item token. The game event may be an individual game event associated with an individual event token of the first set. In another embodiment the first set may include two or more event tokens, at the game event may be a further game event associated with a set having the two or more event tokens as members. The item token may e.g. be a character token, i.e. a game token that represents a virtual game character in the digital game. When the event tokens of the recognised first set of game tokens represent capabilities or other game assets, these game assets are thus made available to the first virtual game item represented by the item token. For the purpose of the present description event tokens and item tokens will collectively be referred to as game tokens or simply as tokens. In some embodiments, a set of game tokens may comprise one or more item tokens and one or more event tokens, each event token being indicative of a game event that is attributable to one or more virtual game items. The processor may be configured, responsive to recognising the one or more event tokens and the one or more item tokens of said predetermined set positioned in a predetermined spatial configuration, to attribute the game events associated with the one or more event tokens of the recognised set to the one or more virtual game item associated with the one or more item tokens of the recognised set.

In some embodiments, the game system further comprises a support element for detachably receiving and, optionally, retaining game tokens. The support element may be configured to receive game tokens in a single spatial configuration only, or in a limited number of spatial configurations. In some embodiments the support element is configured for detachably receiving and, optionally, retaining two or more event tokens in said predetermined spatial configuration. In some embodiments, the game tokens each comprise one or more coupling members and the support element comprises one or more coupling members operable for interengaging corresponding coupling members of the game tokens, i.e. of the event tokens and/or item tokens. The coupling members are configured such that they allow connecting the game tokens with the support element in predetermined respective positions and orientations relative to the support element such that the two or more game tokens can be detachably received by the support element in one or a limited number of predetermined spatial configurations relative to each other; optionally such that the game tokens can only be so received. Accordingly, the support element serves to aid the correct placement of the game tokens in one or more predetermined spatial configuration relative to each other, thus reducing the risk of unsuccessful recognition due to imprecise placement of the game tokens. Moreover, the support element also helps to ensure that the game tokens remain in the predetermined spatial configuration during the image acquisition or in order to facilitate a repeated presentation of the same set of tokens. In some embodiments, the support element is only configured to receive event tokens. In some embodiments, the support element comprises an item token as described herein and/or the support element is operable to detachably receive and, optionally, retain, one or more item tokens in a predetermined spatial configuration with the support element and, hence, with any event tokens attached to the support element.

In some embodiments, the processor may further be configured to recognise the support element in addition to recognising the game tokens attached to the support element, when an image is captured of the support element with the game tokens attached to it. For example, to this end, the support element may carry a machine-readable marker or may have a visually recognisable shape or other visually recognisable feature facilitating recognition of the support element by the processor in a captured image. Recognition of the support element may further reduce the risk of inadvertent recognition of multiple event tokens or other game tokens as a set. Alternatively or additionally, the support element may serve as a game token or as a further modifier/trigger that influences the selection of which further game event is to be triggered by the recognition of the set of event tokens or that otherwise influences how the game system should react on the recognition of the game tokens. In yet another embodiment, the support element may serve as a physical unlock key whose recognition enables triggering of further game events.

In some embodiments, the predetermined spatial configuration comprises a two dimensional arrangement of two or two or more game tokens, e.g. two or more event tokens or one or more event tokens and an item token, within a two-dimensional perimeter, e.g. a rectangular or other polygonal perimeter, a circular or oval perimeter, or the like. For example, the game system may comprise a base plate, a frame or another type of support element, and the game tokens may be detachably attachable to a top face of a base plate, to the frame or the like. Alternatively, an item token or an event token may have the form of a base plate or frame to which the other game tokens can be detachably connected.

Generally, a predetermined spatial configuration of two or more game tokens relative to each other (i.e. of two or more event tokens relative to each other, of one or more event token and one or more item token relative to each other, or of two or more item tokens relative to each other) may be defined completely or in part by the respective positions of the two or more game tokens relative to each other, e.g. by the respective distances of the two or more game tokens from each other. The relative positions, e.g. the relative distances, may be derived by the processors from the one or more images. In particular, the predetermined spatial configuration may completely or at least in part be defined by the respective relative positions, e.g. relative distances, of the representations of the game tokens in the captured image. The distance between two game tokens may be defined as the distance between respective reference points of the game tokens, e.g. respective centroids of an image of the game token, by a corner or another visible reference feature. In some embodiments, the spatial configuration is completely or partly defined by a geometric configuration of the game tokens, e.g. by the game tokens defining corners of a predetermined polygon, e.g. a triangle or square, or by the positions of the game tokens defining another geometric pattern.

In some embodiments, the game tokens, i.e. the event tokens and/or the item tokens, have a visual appearance such that their representation in a captured image is not rotationally symmetric within a two-dimensional image plane defined by the captured image, i.e. such that a relative orientation of two or more game tokens relative to each other can be determined from an image of the game tokens. In particular, the game tokens may have a visual appearance such that they are indicative of a reference direction at least when viewed from a predetermined viewing angle. The reference directions of two game tokens may thus be determined by the processor from the one or more images and used to determine a relative orientation of the game tokens relative to each other. The reference direction may e.g. be defined by an edge of the game token, by two spaced apart reference points, by an axis of symmetry, or the like. Accordingly, a predetermined spatial configuration of two or more game tokens may be defined completely or in part by the respective orientations of the two or more game tokens relative to each other. In some embodiments, the predetermined spatial configuration is defined completely or in part by the respective orientations and positions, e.g. distances, of the two or more game tokens relative to each other. It will be appreciated that recognition of game tokens in a predetermined spatial configuration may require the game tokens to be positioned in the predetermined spatial configuration within certain tolerances, i.e. the processor may recognise game tokens as being positioned in a predetermined spatial configuration as long as they are such positioned within certain predetermined tolerances. These tolerances may be determined by the accuracy of the detection process. In some embodiments even larger tolerances may be accepted, so as to prevent frustrating user experiences.

Generally, in some embodiments, the game tokens, i.e. the event tokens and/or the item tokens, may each comprise one or more coupling members configured for detachably attaching the game token to other game tokens and/or to a support element in a predetermined spatial configuration to other game tokens. To this end the support element may comprise mating coupling members configured for mechanical and detachable interconnection with the coupling members of the game tokens, e.g. in frictional and/or interlocking engagement. In some embodiments, the coupling members are compatible with a toy construction system such that the game tokens may also be used as toy construction elements operable to be detachably connected with other toy construction elements of the toy construction system, e.g. as decorational elements attachable to a toy construction model. Similarly, other toy construction elements of the toy construction system, different from the game tokens, may be connectable to the support element along with the game tokens so as to allow a user to further personalize the sets of tokens. In some embodiments, the other toy construction elements may also be recognisable by the game system in a captured image. In some embodiments, the other toy construction elements, other than the game tokens, do not trigger any game events. The other toy construction elements may be used to properly arrange game tokens in a predetermined spatial configuration, e.g. due to spatial constraints imposed by the toy construction system on the spatial configurations in which the toy construction elements can be interconnected with each other.

As described above, the game system comprises a plurality of game tokens. The plurality of game tokens comprises a plurality of event tokens and, optionally one or more item tokens. The event tokens and/or the item tokens may be physical tokens, such as toy objects, e.g. in the form of a plate, coin, cube, figurine or other tangible object. Alternatively, the game tokens may be representations of a physical token, e.g. an image or graphical representation depicting or otherwise visibly representing a physical token. The representation may be photorealistic or more schematic but sufficient for the game system to recognise the game token in a captured image of the representation. In some embodiments, the event tokens and/or the item tokens may carry respective machine-recognisable markers that are recognisable by the processor in a captured image of the token. Alternatively or additionally, the game tokens may have a visually recognisable shape or other visually recognisable features. The event tokens may further have decorations or otherwise resemble or represent the game event triggered by them so as to allow a user to associate the event tokens with the respective game events and facilitate appropriate selection of tokens. Similarly, the item tokens may further have decorations or otherwise resemble or represent the game item associated with the item token. In some embodiments, the event tokens and/or item tokens have the form of tiles that have a top face on which decorations and/or machine recognisable markers are placed. The tiles may have one or more coupling members on a bottom face of the tile so as to allow a user to detachably fasten the tile to a support element.

In some embodiments, the image capturing device is a camera, such as a digital camera, e.g. a conventional digital camera. The image capturing device may be a built-in camera of a portable processing device. Generally, examples of portable processing devices include a tablet computer, a laptop computer, a smartphone or other mobile device. In some embodiments, the image capturing device comprises a 3D capturing device such as a 3D sensitive camera, e.g. a depth sensitive camera combining high resolution image information with depth information. An example of a depth sensitive camera is the Intel® RealSense™ 3D camera, such as the model F200 available in a developer kit from Intel Corporation. The image capturing device may be operable to capture one or more still images. In some embodiments the digital camera is a video camera configured to capture a video stream.

The processor is adapted to detect the game tokens in the captured image(s) and to recognise the game tokens. Recognition of an event token further comprises identifying the corresponding individual game event associated with the recognised event token. Similarly, recognition of an item token further comprises identifying the corresponding virtual game item associated with the recognised item token. To this end, the game system may comprise a library of known game tokens each associated with information about the corresponding associated individual game event and/or the associated virtual game item. The library may further include information about known sets of two or more game tokens, each set being associated with information about the associated further game event associated with said set. Alternatively or additionally, the association between sets of game tokens and corresponding further game events may be implemented by the processor based on a set of rules for determining, for a given set of game tokens, which further game event is to be associated with said set of game tokens. The rules may e.g. be part of the computer program code or stored separately.

Here and in the following, the term processor is intended to comprise any circuit and/or device suitably adapted to perform the functions described herein. In particular, the term processor comprises a general- or special-purpose programmable microprocessor, such as a central processing unit (CPU) of a computer or of another data processing system, a digital signal processor (DSP), an application specific integrated circuits (ASIC), a programmable logic arrays (PLA), a field programmable gate array (FPGA), a special purpose electronic circuit, etc., or a combination thereof. The processor may be integrated into a portable processing device, e.g. where the portable processing device further comprises the image capturing device and a display. It will be appreciated, however, that the game system may also be implemented as a client-server or a similar distributed system, where the image capturing and other user interaction is performed by a client device, while the image processing and recognition tasks may be performed by a remote host system in communication with the client device. According to some embodiments, an image capturing device or a mobile device with an image capturing device may communicate with a computer, e.g. by wireless communication with a computing device comprising a processor, data storage and a display.

In some embodiments, the image capturing device communicates with a display that shows in real-time a scene as seen by the image capturing device so as to facilitate targeting the desired event token(s) whose image is to be captured.

The present disclosure relates to different aspects including the game system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a method, implemented by a processor, of operating a game system, the game system comprising a plurality of game tokens, an image capturing device and the processor; the image capturing device being operable to capture one or more images of one or more game tokens placed within a field of view of the image capturing device, the plurality of game tokens comprising a plurality of event tokens; wherein the method comprises:

executing a digital game, the digital game comprising computer executable code configured to cause the processor to associate one or more individual game events with each of the plurality of event tokens; and to associate one or more further game events with each of a plurality of sets of game tokens each set comprising two or more game tokens and each set comprising one or more event tokens chosen from said plurality of event tokens;

receiving one or more images captured by said image capturing device;

recognising one or more game tokens of the plurality of game tokens within the one or more images, the recognised one or more game tokens including one or more event token;

responsive to recognising a single event token of the plurality of event tokens in the one or more images, causing the one or more individual game events associated with the recognised event token;

responsive to recognising one of the plurality of sets of game tokens in the one or more images, where the game tokens of the recognised set are positioned in a predetermined spatial configuration relative to each other, causing the one or more further game events associated with the recognised set.

According to yet another aspect, disclosed herein is a processing device, e.g. a portable processing device, configured to perform one or more of the methods disclosed herein. The processing device may comprise a suitably programmed computer such as a portable computer, a tablet computer, a smartphone, a PDA or another programmable computing device, e.g. a device having a graphical user-interface and, optionally, a camera or other image capturing device.

Generally, the digital game may be implemented as a computer program, e.g. as a computer readable medium having stored thereon the computer program. Accordingly, according to yet another aspect, disclosed herein is a computer program which may be encoded on a computer readable medium, such as a disk drive or other memory device. The computer program comprises program code adapted to cause, when executed by a processing device, the processing device to perform one or more of the methods described herein. The computer program may be embodied as a computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store. According to one aspect, a computer-readable medium has stored thereon instructions which, when executed by one or more processing units, cause the processing unit to perform an embodiment of the process described herein.

The present disclosure further relates to a toy construction set comprising a plurality of toy construction elements, including a plurality of event tokens, and instructions to obtain a computer program code that causes a processing device to carry out the steps of an embodiment of one or more of the methods described herein, when the computer program code is executed by the processing device. For example, the instructions may be provided in the form of an internet address, a reference to an App store, or the like. The instructions may be provided in machine readable form, e.g. as a QR code or the like. The toy construction set may even comprise a computer-readable medium having stored thereon the computer program code. Such a toy construction set may further comprise a camera or other image capturing device connectable to a data processing system.

Additional features and advantages will be made apparent from the following detailed description of embodiments that proceeds with reference to the accompanying drawings.

BRIEF DESCRIPTION OF THE DRAWINGS

Preferred embodiments of the invention will be described in more detail in connection with the appended drawings, where FIG. 1 schematically illustrates an embodiment of the game system described herein.

DETAILED DESCRIPTION

Embodiments of the method and system disclosed herein may be used in connection with a variety of toy objects and, in particular with construction toys that use modular toy construction elements based on dimensional constants, constraints and matches, with various assembly systems like magnets, studs, notches, sleeves, with or without interlocking connection etc. Examples of these systems include but are not limited to the toy constructions system available under the tradename LEGO. For example, U.S. Pat. No. 3,005,282 and U.S. D253711S disclose one such interlocking toy construction system and toy figures, respectively.

Figure 1:
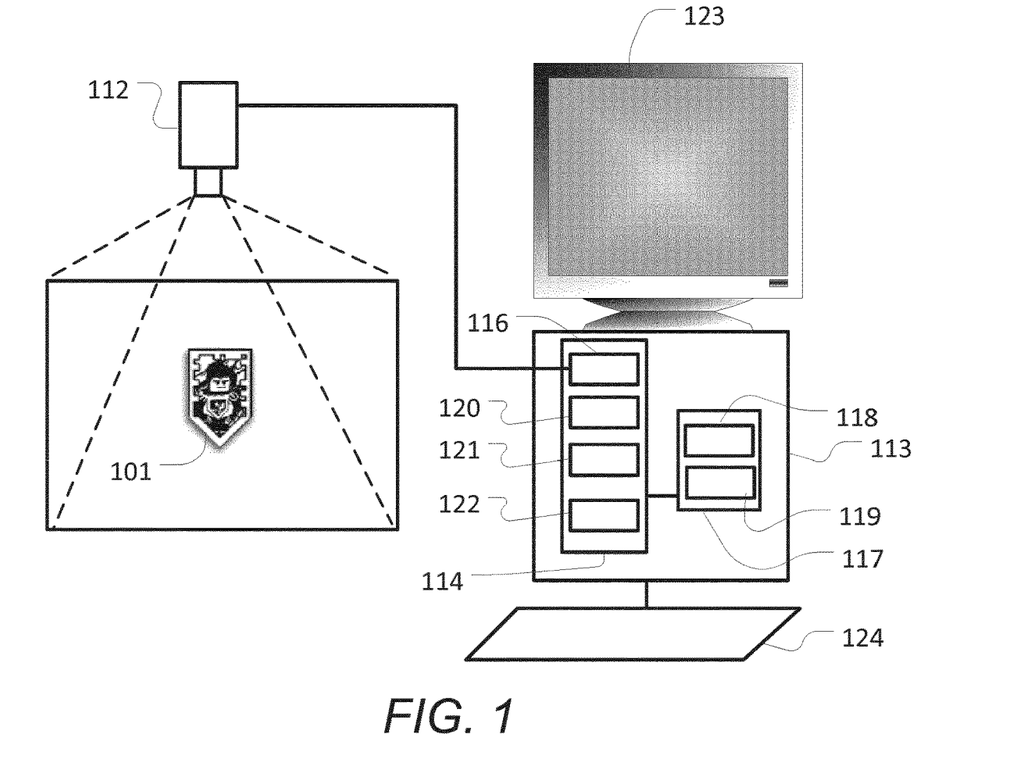

FIG. 1 schematically illustrates an embodiment of the game system described herein. The game system comprises one or more event tokens 101 and a data processing device. The system may comprise additional event tokens and, optionally other types of game tokens, e.g. item tokens as described herein.

The data processing device comprises an image capturing device 112, a processing unit 113, a display 123, and a user input interface unit 124, such as a keyboard, a mouse, joystick, a touch-sensitive screen, etc. In some embodiments, the various components of the data processing device may be implemented as separate devices that are communicatively coupled to each other via wired or wireless connections. In other embodiments, some or all of the components may be integrated into a single device, e.g. in a tablet computer, a smartphone or the like.

The processing unit comprises a processor 114, e.g. a CPU, and a storage device 117, e.g. a hard disk, an EEPROM, a RAM or another suitable data storage device having stored thereon a computer program 118 and a token database 119 of known event tokens, sets of event tokens and, optionally item tokens. The token database may be stored separately from the computer program or as an integral part of the computer program. The token database 119 may alternatively be stored on a remote storage device accessible to the processing unit, e.g. via the internet or another suitable communication channel.

When the computer program is executed by the processor 114 it implements a number of functional modules, including:
- a reading module 116 configured to receive a digital image from the digital image capturing device;
- a detection module 120 configured to detect one or more event tokens in a digital image and to determine the relative position and orientation of the detected event tokens;
- a recognition module 121 configured to recognize one or more event tokens from a digital image;
- a game module 122 configured to control a digital game and to trigger game events in the digital game.

The reading module 116, the recognition module 121, the detection module 120 and the game module 122 may be implemented as different modules of a software application or integrated into a single software application. The reading module 116, the recognition module 121, the detection module 120 and the game module 122 may e.g. be implemented by a mobile application or a program executed on a client computer or other client device, thus eliminating the need of an internet or other network connection. Alternatively, the above modules may be implemented as a distributed system, e.g. a client-server or cloud-based architecture.

The reading module 116 is configured to receive an image, said image including an image of one or more event tokens and, optionally other types of game tokens and/or other toy construction elements.

The detection module 120 is configured to detect one or more event tokens and/or item tokens in said received image and their relative positions and, optionally, orientations within the image or at least their relative positions and, optionally, orientations, relative to each other. The detection module may further extract images of the detected event tokens from a background portion of the digital image. The detection module may thus be configured to segment a digital image and detect one or more event tokens in the digital image.

The recognition module 121 is configured to recognize the detected event tokens and/or item tokens in a digital image, i.e. to recognise event tokens or item tokens as known event tokens or item tokens. For example, the recognition module may recognise a marker, e.g. a visible code or identifier, on a detected token or otherwise recognise one or more features of the token. To this end, the recognition module may have access to the token database 119 which may comprise a library of known game tokens. For each known game token, the library may comprise information about the marker, code, identifier or other set of features that identify the token. The database may further comprise, for each known event token, information identifying one or more game events associated with the respective event token and, for each item token, information identifying an associated virtual game item, e.g. an associated virtual character.

The game module 122 uses an identifier of the event token and obtains the corresponding information identifying the corresponding game event stored in the token database 119, e.g. a central database or a web source, e.g. via a web service or other network protocol. The game module is further configured to execute a video game or other digital game experience.

Figure 2:
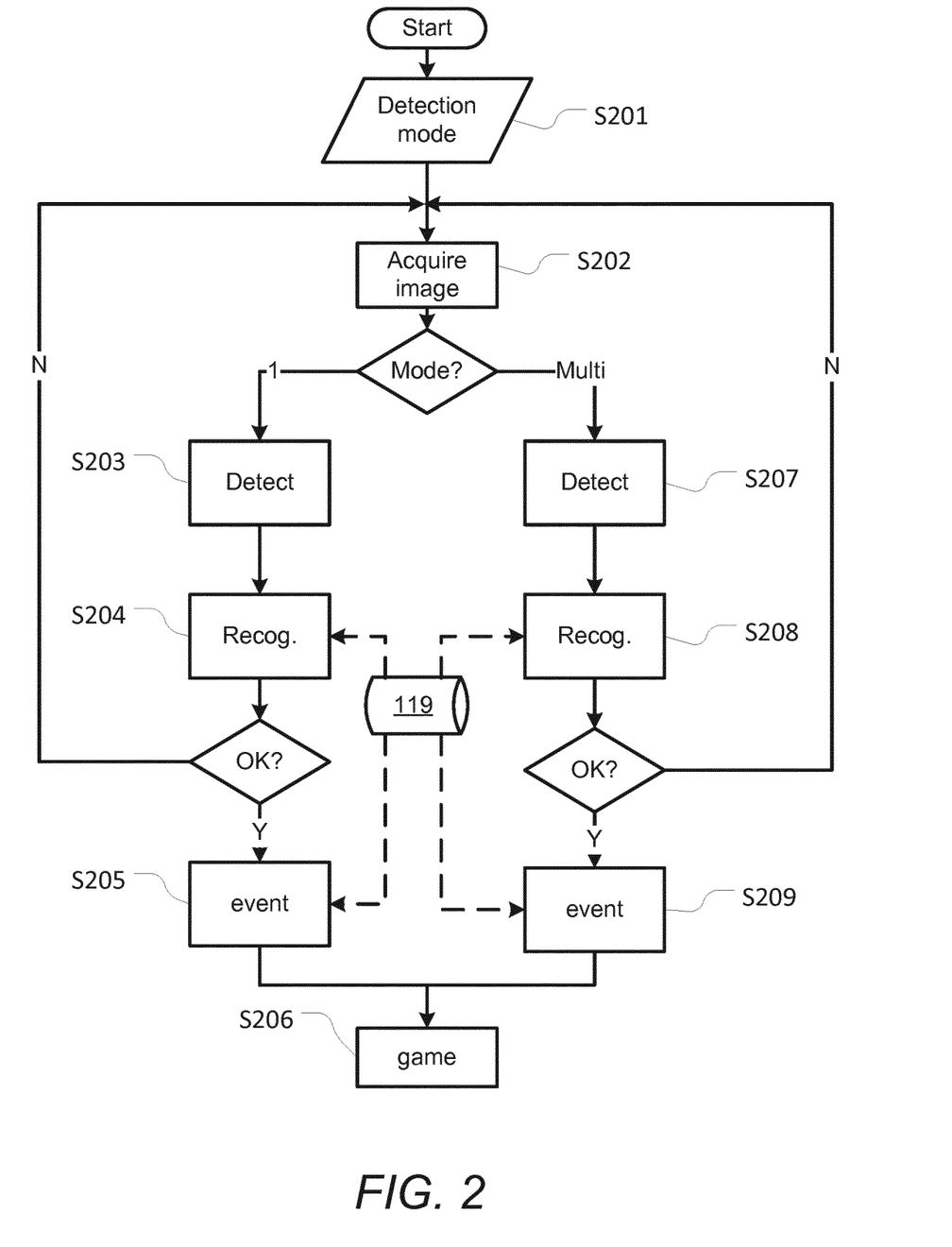
FIG. 2 shows a flow diagram an example of a method implemented by a game system described herein.

FIG. 2 depicts steps of a method implemented by a game system as disclosed herein, e.g. by the system of FIG. 1.

In an initial step S201, the process receives an indication, by means of a user-input, as to whether detection of a single event token is desired or detection of a set of multiple tokens. In some embodiments, detection of multiple tokens comprises the detection of a predetermined specific number of tokens, e.g. always 3 tokens or always 4 tokens, etc. In other embodiments the number of tokens in the sets may vary, i.e. some sets may include more tokens than others. In any event, the process may provide a user-interface allowing the user a selection between two or more detection modes. It will be appreciated, that some embodiments of the process may provide more than two detection modes, e.g. for detecting sets in different spatial configurations or sets including different numbers of tokens.

In subsequent step S202, the process reads one or more digital images; each image may represent a still image captured with a digital camera or a fragment of a video sequence captured with a digital video camera. The process may read the digital image from an input device, e.g. directly from an image capturing device, from a storage device, or the like.

If the user has selected detection a single event token, the process proceeds at step S203; if the user has detected detection of a set of multiple tokens, the process proceeds at step S207.

In step S203, the process performs a detection process on the captured image in order to detect an event token in the captured image. Generally, detection can be done in several ways, e.g. including the extracting of contours after edge detection with e.g. Canny algorithm, and then performing a recognition tasks for each image region where a contour is found, or by using a sliding window approach and by gathering top prediction scores and thus identifying regions of the image which contain objects that are likely toy object candidates. The detection may use a colour-based detection, selective search or any other detection method. The detection may be done by taking different subcrops of a digital image by a sliding window and/or following an edge recognition and/or contour extraction process and/or by another suitable detection algorithm. In some embodiments, the process may display, in real-time, the captured images on a display of the processing device. The process may also display an overlaid frame or similar indication for guiding a user in positioning the camera such that the targeted event token is positioned at a predetermined position, orientation and scale relative to the captured image, as this greatly facilitates the detection of the token in the image.

In subsequent step S204, the process recognizes the detected event token that has been detected in the captured image. To this end, the process may detect one or more features of the event token, e.g. one or more features of a marker carried by the event token or another optically machine-readable code, or other suitable identifying information. The process may compare the detected features, code or other identifying information with corresponding information stored in a library 119 of known event tokens so as to identify a matching event token.

It will be appreciated that steps S203 and S204 may be integrated into a single step. In any event, if the process fails to detect or reliably recognise an event token in the image, the process may terminate or return to e.g. step S202, optionally combined with a suitable message or instruction to the user as to how to capture an image of the event token.

Otherwise, the process proceeds at step S205 where the process determines which game event is to be triggered by the recognition of the event token. To this end, the process may retrieve an identification of the game event associated with the recognised event token from the library 119 of known event tokens. The process triggers the determined event and proceeds at step S206.

In subsequent step S206, the process may proceed with the digital game or allow the user to capture further images of event tokens.

In step S207, the process performs a detection process on the captured image in order to detect two or more event tokens in the captured image that are positioned in a predetermined spatial configuration. Generally, the detection process may be similar to the process described in connection with step S203 above, but where the process detects multiple event tokens in the image and further detects the relative position and orientation of the detected event tokens in the image. As in the detection step S203, the process may display, in real-time, the captured images on a display of the processing device. The process may also display an overlaid frame or similar indication for guiding a user in positioning the camera and the event tokens such that the targeted event tokens are positioned at a predetermined position, orientation and scale relative to the captured image and relative to each other, as this greatly facilitates the detection of the tokens in the image.

In step S208, the process recognizes the detected event tokens based on detected features or other suitable identifying information as described for the case of a single token in step S204. As in the case of a single event token, it will be appreciated that steps S207 and S208 may be integrated into a single step. In any event, if the process fails to detect or reliably recognise the expected number of event tokens in the image, the process may terminate or return to e.g. step S202, optionally combined with a suitable message or instruction to the user as to how to position the event tokens and how to capture an image of the event tokens. For example, in an embodiment, where all sets of event tokens consist of three event tokens, a successful recognition requires the recognition of three tokens in the predetermined spatial configuration relative to each other.

Upon successful recognition of a set of event tokens, in step S209, the process determines which game event is to be triggered by the recognition of the set of event tokens. To this end, the library 119 of event tokens may further comprise a library of sets of event tokens where each record in the library of sets includes identifications of the members of the set and information indicative of a game event that is associated with said set. The process triggers the determined event and proceeds at step S206.

Figure 3:
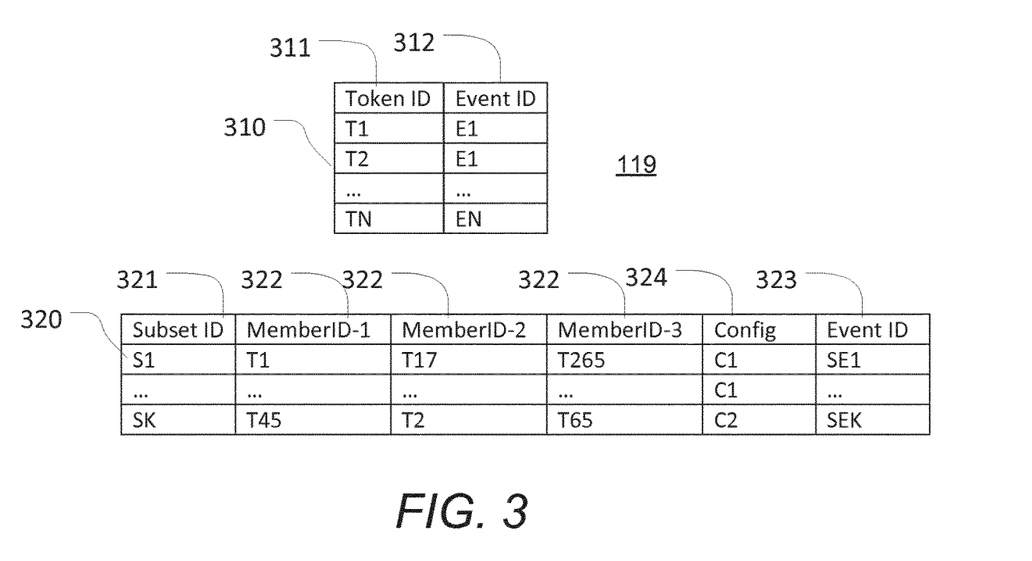
FIG. 3 schematically illustrates an example of a structure of a token library.

FIG. 3 illustrates an example of a structure of a token library, generally designated by reference numeral 119. The library includes a table 310 of individual game tokens. The table includes a plurality of records, e.g. arranged as rows in a table, where each record is associated with a known event token. Each record in table 310 includes a token identifier 311 and an associated individual game event identifier 312. Optionally, the record may include further information, such as additional identification information for use during recognition of an event token in an image in embodiments where the token identifier is not sufficient. Alternatively or additionally event tokens may be associated with multiple game events; accordingly, a token record may include identifiers of multiple game events.

The library includes a second table 320 of known sets of tokens, where each record in table 320 is associated with a known set of multiple event tokens. Each record includes a set identifier 321 identifying the set of tokens. Each record further includes the identifiers 322 of the individual tokens forming the set and an identifier 323 of an associated game event. The identifiers 322 of the individual tokens may point to the individual token identifiers 311 of the table 310. Each record may further include information 324 about the required spatial configuration in which the members of the set have to be arranged in order to be recognised as a set. In embodiments where all sets are associated with the same spatial configuration, this entry may of course be omitted. In the example of FIG. 3, each set includes three event tokens and each set is associated with a single game event. In other embodiments, the number of tokens per set and/or the number of game events associated with a set may be different or even vary from set to set. It will further be appreciated that the token library may further include records related to other types of game tokens, such as item tokens.

Figure 4:
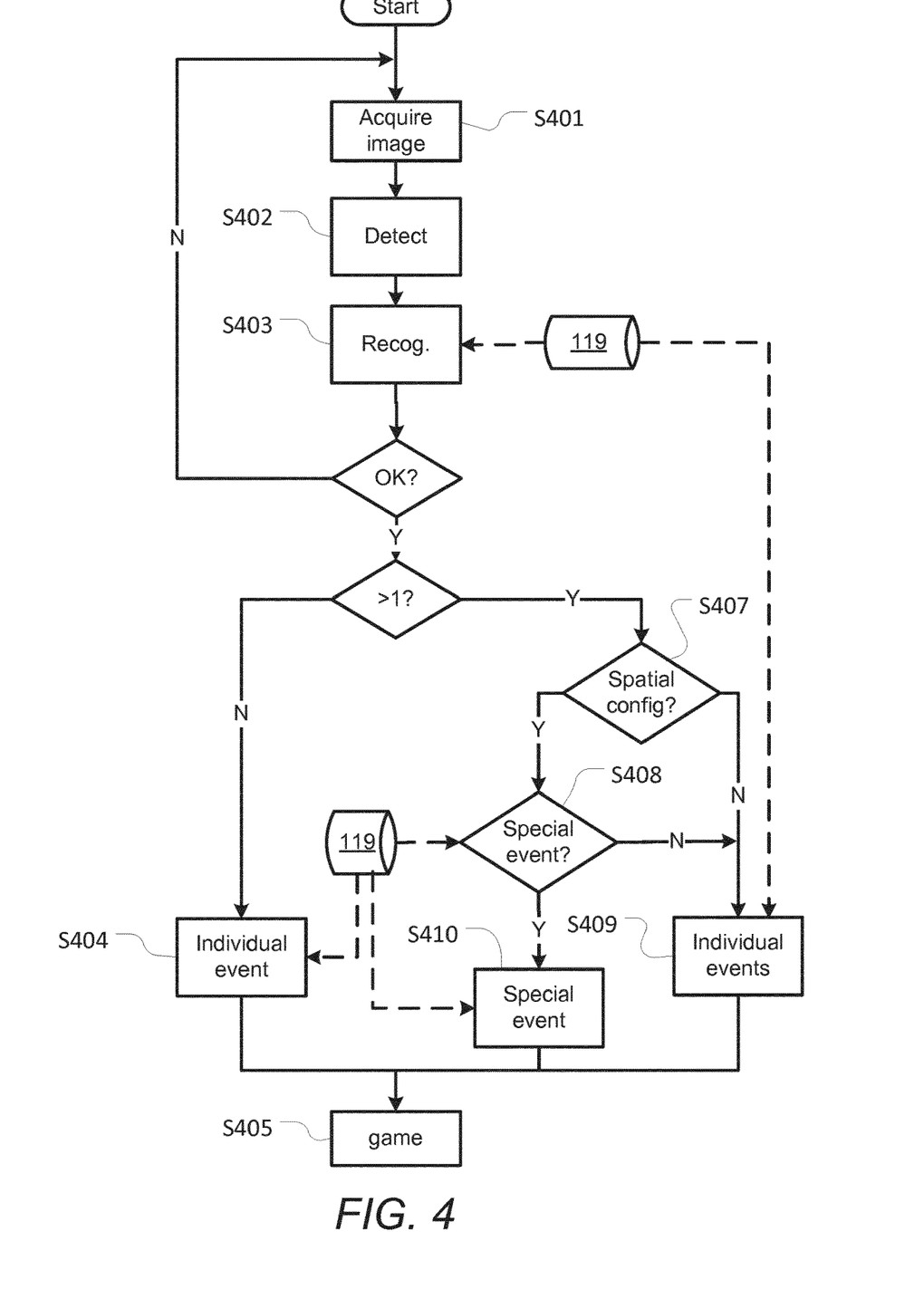
FIG. 4 shows a flow diagram of another example of a method implemented by a game system as described herein.

FIG. 4 depicts steps of another example of a method implemented by a game system as disclosed herein, e.g. by the system of FIG. 1. The method of FIG. 4 is similar to the method of FIG. 2 but where the process automatically detects whether the user has captured an image of a single event token, multiple event tokens or multiple event tokens arranged in a predetermined spatial configuration.

In an initial step S401, the process reads one or more digital images; each image may represent a still image captured with a digital camera or a fragment of a video sequence captured with a digital video camera. The process may read the digital image from an input device, e.g. directly from an image capturing device, from a storage device, or the like.

In step S402, the process performs a detection process on the captured image in order to detect one or more event tokens in the captured image, e.g. as described in connection with step S203 of FIG. 2.

In step S403, the process recognizes each of the detected event tokens, e.g. with reference to a library 119 of event tokens as described above.

If the process has not detected any event token, the process may terminate or return to e.g. step S401, optionally combined with a suitable message or instruction to the user as to how to capture an image of an event token. Otherwise, if the process has detected and recognised a single event token, the process proceeds at step S404; if the process has recognised multiple event tokens in the same image, the process proceeds at step S407.

In step S404, the process determines which individual game event is to be triggered by the recognition of the single event token, e.g. by reference to the token library 119 as described above. The process then triggers the determined individual game event and proceeds at step S405.

In subsequent step S405, the process proceeds with the digital game or allow the user to capture further images of event tokens.

In step S407, the process determines whether the multiple recognised tokens have been detected in a predetermined spatial configuration to each other. If this is the case, the process proceeds at step S408; otherwise, the process proceeds at step S409.

In step S408, the process determines, by reference to token library 119, which further game event is to be triggered by the recognition of the set of event tokens in the detected spatial configuration. If no specific game event is associated with the particular set of event tokens, the process proceeds at step S409; otherwise, the process then proceeds at step S410.

In step S410, the process triggers the determined further game event and proceeds at step S405.

In step S409, the process determines, by reference to library 119, which game event is associated to each of the individual event tokens. The process then triggers the determined individual game events and proceeds at step S405.

While the methods of FIGS. 2 and 4 have been described with reference to event tokens, it will be appreciated that alternative embodiments may also include detection and recognition of other types of game tokens, such as item tokens, and of sets of game tokens that include both item tokens and event tokens.

Figure 5:
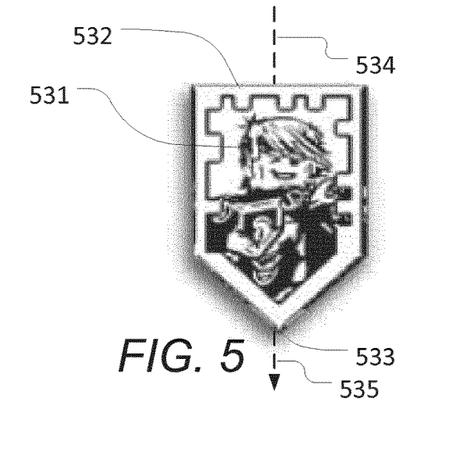
FIG. 5 schematically shows an example of an event token.

FIG. 5 shows a top view of an example of an event token. The token has the form of a plate having a pentagonal periphery. Generally, the token may be manufactured from any suitable material, such as plastic, metal or wood, preferably sufficiently rigid to allow detachable mechanical connection to a base plate or other support member, e.g. by interlocking and/or friction-based attachment. The plate has a pointed end 533 which may define a reference point relative to the token. The token further defines an axis 534 extending through the point 533 which defines an orientation of the token, as indicated by the arrow 535 in FIG. 5. It will be appreciated that other embodiments of tokens may be a different shape, such as a plate having a differently-shaped periphery, or a cube or any other three-dimensional shape.

The token defines a top surface which is decorated by a suitable decoration 531, e.g. an illustration illustrating the game event triggered by the token. The token is further provided with a machine-readable code 532 which in this example is provided as lines extending along the periphery of the top surface of the token. The lines have narrow and wide portions where the positions and dimensions of the narrow and wide portions encode a token identifier. It will be appreciated that other embodiments of game tokens may be provided with other visually detectable markers, such as QR codes, color codes, etc. In some embodiments, the markers may be integrated into the decoration, e.g. in a manner that the marker can readily be recognised as a marker or in an imperceptible manner. In some embodiments different sides of a token may be provided with different codes or markers such that a token may trigger different game events depending on which side is visible to the camera which is used to capture an image of the token.

With reference to FIGS. 6-9, examples of the detection and recognition of event tokens will be described, e.g. as performed by the methods of FIG. 2 or 4.

Figure 6:
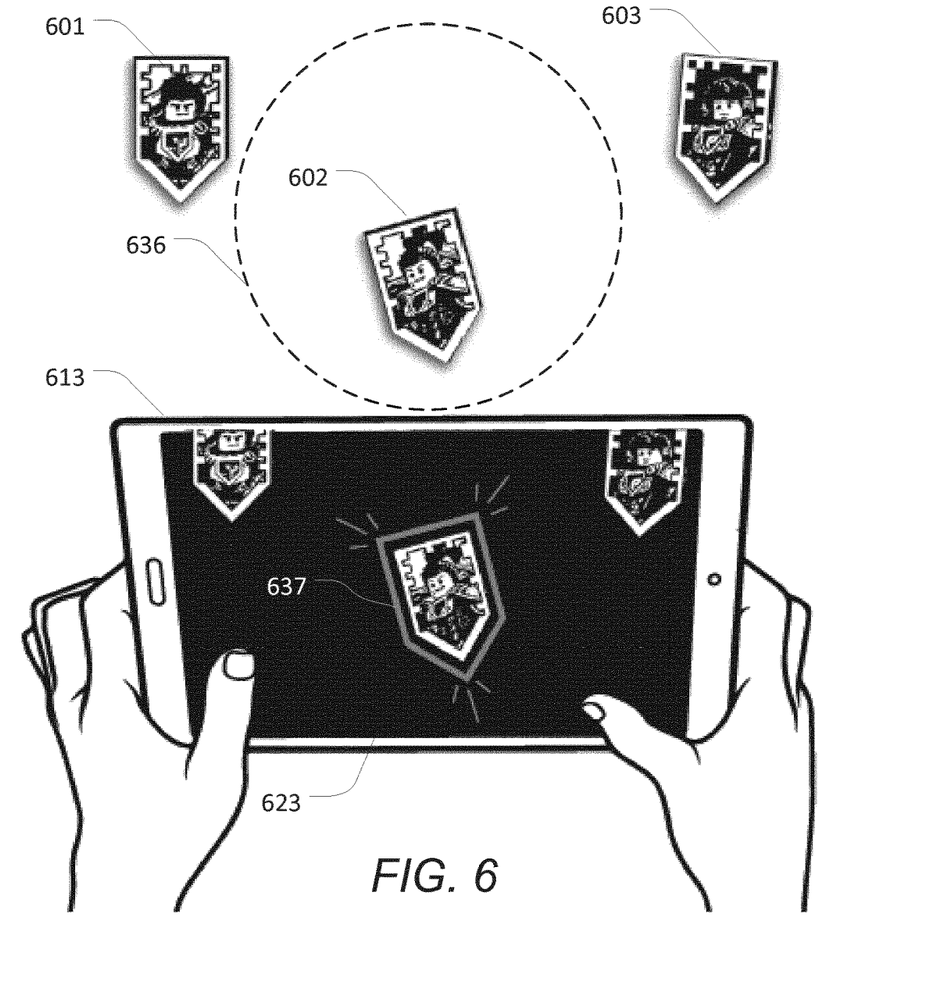
FIGS. 6-9 illustrate steps of an example of a method implemented by a game system described herein.

FIG. 6 shows a portable processing device 613, in this example a tablet computer having a touch-screen display and a built-in camera, held by a user such that the camera of the portable processing device captures an image of an event token 602. The event token is placed on a table or a similar surface along with other event tokens 601 and 603.

The portable processing device displays the image captured by the camera on the display 623, optionally overlaid/augmented with visual guides for facilitating correct alignment. In this example, the processing device detects and recognises event token 602 as a single event token, even though the other event tokens 601 and 603 are also at least partially within the field of view of the camera. However, as the distance between the token 602 that is positioned closest to the center of the field of view of the camera and the other tokens 610 and 603 is larger than a predetermined threshold (indicated by dashed circle 636), the centrally positioned token 602 is detected and recognised as a single token. Other embodiments may use other criteria for detecting single or multiple tokens. For example, some embodiments may recognise all tokens that are completely visible within the captured image.

The processing device illustrates the successful recognition of token 602, e.g. by displaying the captured image augmented with a blinking frame 637 surrounding the recognised token. It will be appreciated that the processor may use other suitable mechanisms to indicate that a token has been detected and which token has been detected. In some embodiments, the processing device may even indicate which game event will be triggered by the recognised token, e.g. by augmenting the captured image with a suitable graphical representation or by providing a subsequent animation illustrating the game event associated with the recognised token. For example, the recognised token may trigger a certain game asset, such as a capability, a weapon, a piece of clothing, a resource, etc., being made available in the digital game, e.g. such that the player may assign the game asset to a virtual game character. Additionally or alternatively to a graphical representation and/or an animation, the game event may be illustrated by sound or vibration or other movements.

Figure 7:
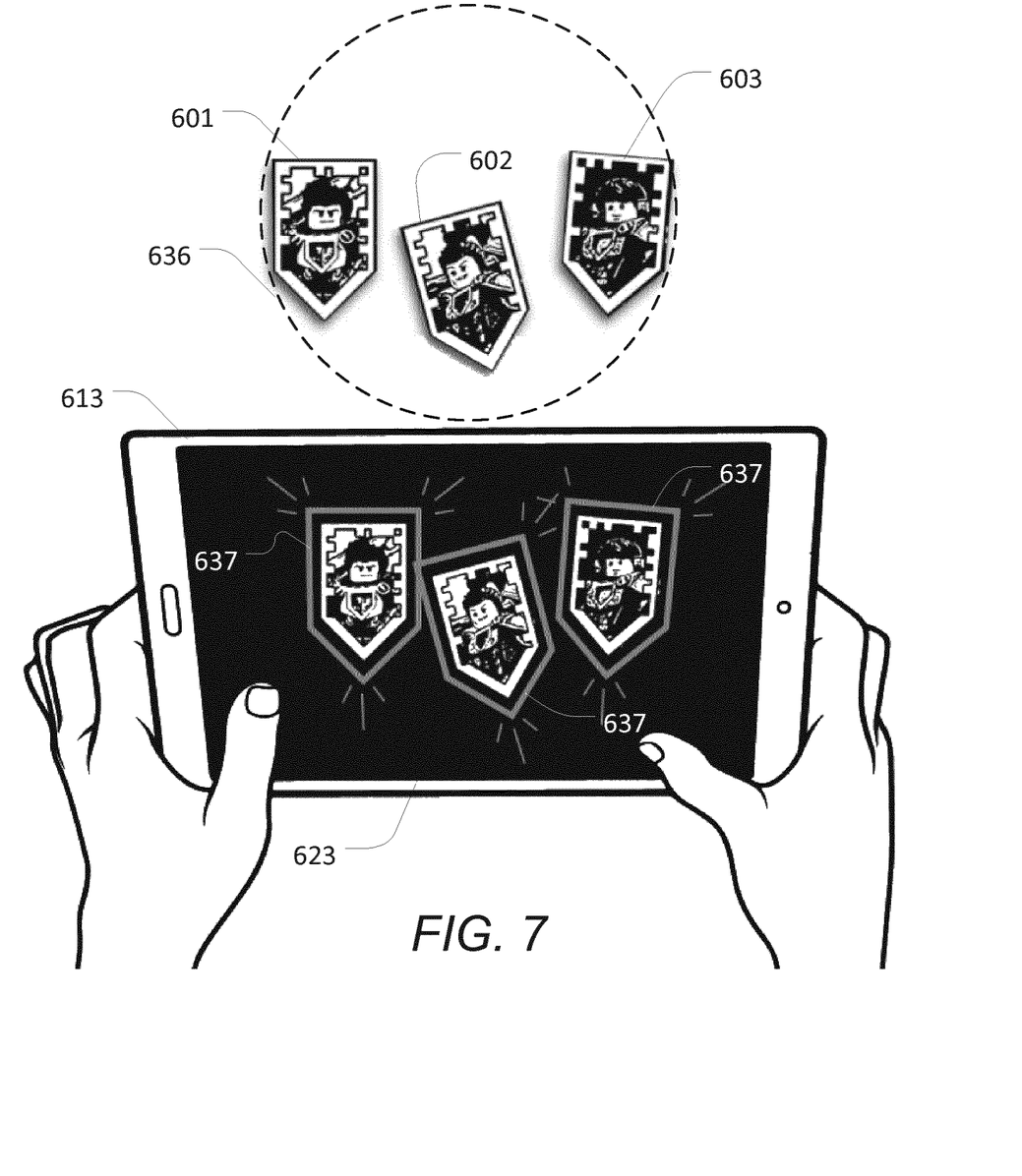

FIG. 7 shows a situation similar to the one shown in FIG. 6 in that the portable processing device 613 is held by a user such that the camera of the portable processing device captures an image of an event token 602 which is placed on a table or a similar surface along with other event tokens 601 and 603. In the example of FIG. 7 the tokens 601, 602 and 603 are all within a predetermined proximity around the centrally located token 602, as indicated by dashed circle 636. Accordingly, the processing device has recognised all three event tokens 601, 602 and 603 as three individual event tokens. The processing device indicates this by augmenting the captured image that is displayed on display 623 with blinking frames 637 surrounding each recognised token. Responsive to the detection of the three tokens, the processing device may trigger three individual game events (e.g. making three individual game assets available to the player), where each of the triggered individual game events is associated with one of the recognised tokens.

Figure 8:
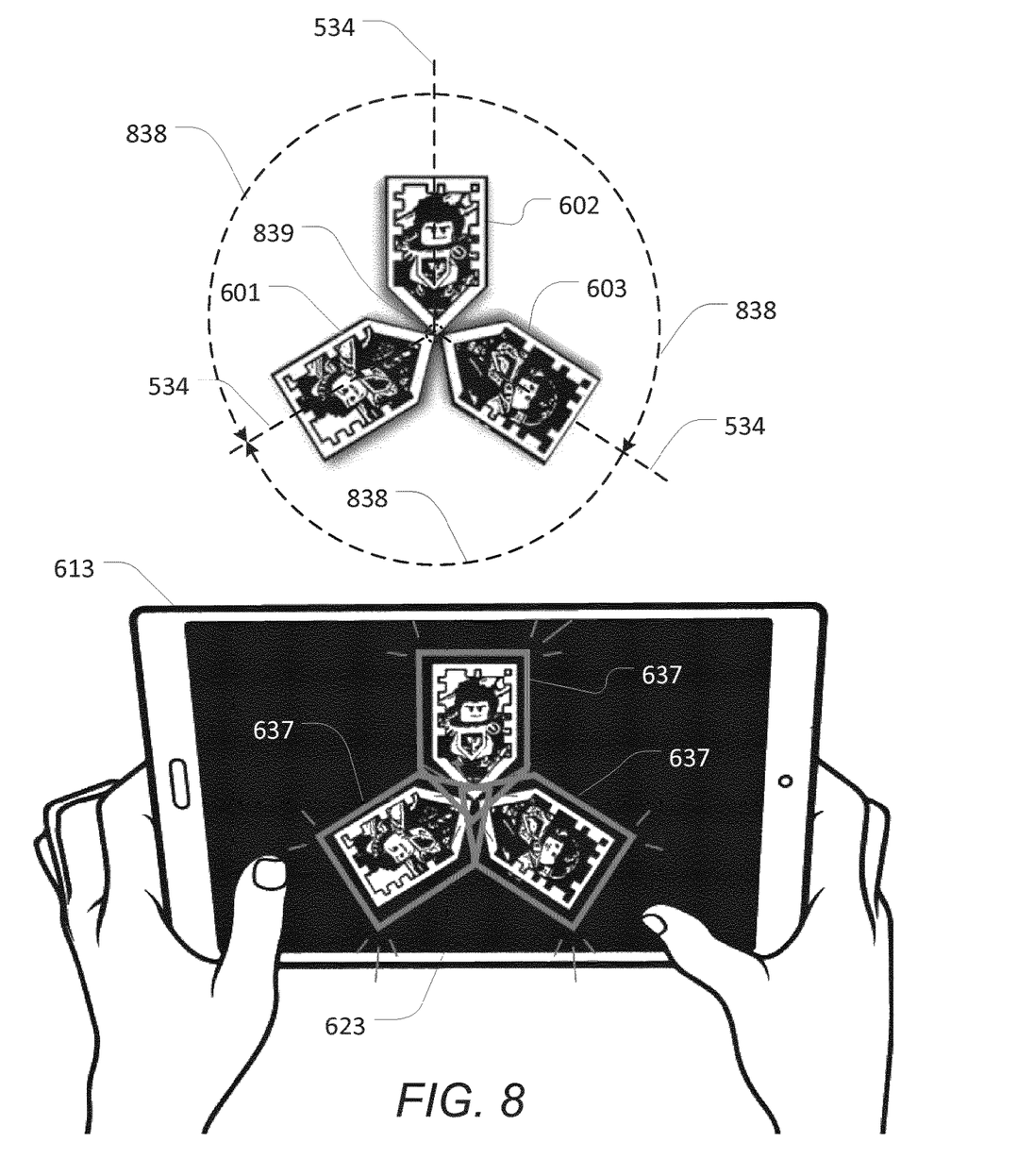

FIG. 8 shows a situation similar to the one shown in FIG. 7 in that the portable processing device 613 is held by a user such that the camera of the portable processing device captures an image of event tokens 601, 602, and 603 which are all placed on a table or a similar surface. In the example of FIG. 8 the tokens 601, 602 and 603 are not only all within a predetermined proximity around token 602, but they are all positioned in a spatial configuration that is recognised as a known spatial configuration by the processing device.

In this example, the recognised spatial configuration is defined by the two-dimensional geometry in which the three tokens are placed on the table or other surface, i.e. the relative positions and orientations of the tokens in the image captured by the camera of the processing device. In this example, the configuration is defined by the pointed tips of the tokens touching each other, or at least being positioned in close proximity to each other (as indicated by dashed circle 639), and by the central axes 534 of the tokens defining respective 120 deg. angles to the axes of the respective other tokens as illustrated by dashed arcs 838. It will be appreciated that the recognition of a predetermined spatial configuration may be associated with a certain detection accuracy such that positions and/or orientations within a certain range may be recognised as being conform to the predetermined spatial configuration.

Responsive to the detection of the three tokens in the predetermined spatial configuration, the processing device may trigger a further game event instead of the individual game events otherwise associated with the individual tokens. In some embodiments, the process may trigger the further game event in addition to triggering the individual game events that are associated with the individual tokens.

Figure 9:
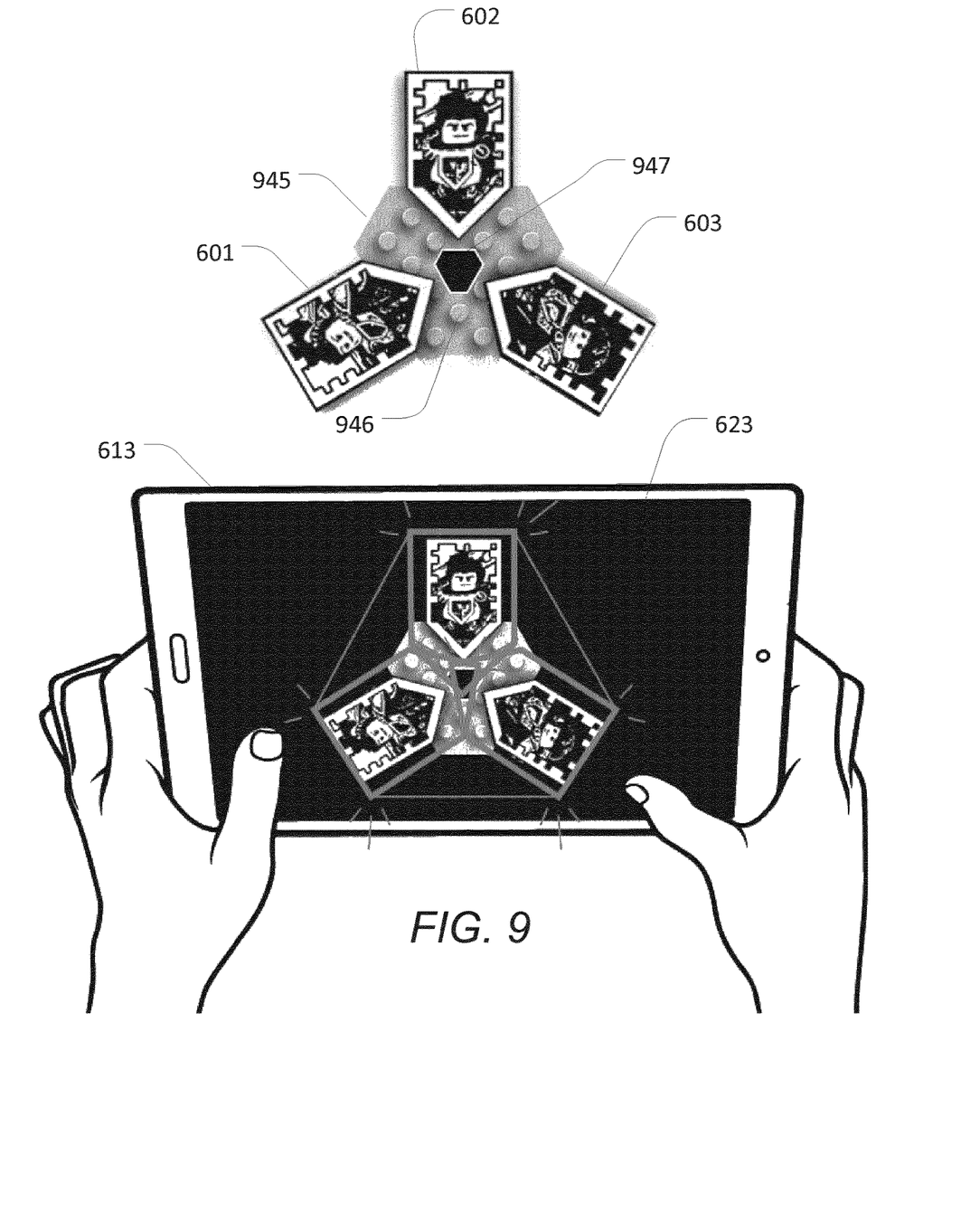

FIG. 9 shows a situation similar to the one shown in FIG. 8 in that the portable processing device 613 is held by a user such that the camera of the portable processing device captures an image of event tokens 601, 602 and 603 placed on a table or similar surface in a spatial configuration that is recognised by the portable processing device. In this example, the tokens are detachably connected to a token holder 945. To this end, the tokens have coupling members on their bottom side, opposite the top side that carries the visible marker for identifying the tokens. The token holder also has coupling members 946 on its upper side such that the coupling members of the tokens and the coupling members of the holder can engage each other in a mating connection. The coupling members may even be configured such that the tokens can only be attached to the token holder at a predetermined number of positions and such that, at each position, a token can only be attached in a single orientation. Accordingly, the token holder only allows the tokens to be attached such they are positioned for them to be recognised by the processing device as being in the predetermined spatial configuration.

In the example of FIG. 9, the token holder is also provided with a machine readable marker 947 that is recognisable by the processing device. In some embodiments, the game system may comprise a plurality of token holders each having a different machine readable marker. When the processing device detects the event tokens in the predetermined spatial configuration and further detects the token holder, the processing device may trigger a game event that is determined by the set of tokens arranged in the predetermined spatial configuration and by the marker of the token holder. For example, the same set of tokens may trigger different game events, depending on which token holder they are attached to.

In the example of FIG. 9, the token holder has the form of a base plate. In other embodiments, the token holder may have a form different from a plate, e.g. a frame such as a rectangular frame having coupling members that allow attachment of the game tokens inside the frame. I yet further embodiments, the game tokens may include tokens that have a three-dimensional representation of e.g. a game character or another type of game asset. In yet another embodiment, one or more of the game tokens may also function as a token holder to which other game tokens may be attached, e.g. such that the game token has coupling members on its top surface to which other game tokens can be attach. In this case, a separate token holder may thus not be needed.

As described above, in some embodiments, if there are not the required number of game tokens and/or not the required numbers of each of the different types of game tokens, e.g. of character tokens or event tokens, the processing device may not recognise the detected game tokens as representing a further game event. Similarly, if the game tokens are not arranged at their prescribed relative positions and/or relative orientations, at least not within certain, e.g. predetermined, tolerances the processing device may not recognise the detected game tokens as representing a further game event. Nevertheless, in some embodiment, detection of additional game tokens, in addition to the prescribed number and types of game tokens, may not influence the recognition of the game tokens as representing a further game event. In some embodiments, the game tokens may not have to be physically interconnected e.g. by connecting them to a common token holder. Instead, it may be sufficient, if they are placed in the predetermined spatial configuration when their image is captured by the image capturing device.

Although the invention has been described with reference to certain specific embodiments, various modifications thereof will be apparent to those skilled in art without departing from the spirit and scope of the invention as outlined in claims appended hereto.

The invention claimed is:

1. A game system, comprising: a plurality of game tokens, an image capturing device, a support element, and a processor; the image capturing device being operable to capture one or more images of one or more game tokens placed within a field of view of the image capturing device, the plurality of game tokens comprising a plurality of event tokens, wherein the processor is configured to:
   execute a digital game, the digital game comprising computer executable code configured to cause the processor to associate one or more individual game events with each of the plurality of event tokens; and to associate one or more further game events with each of a plurality of sets of game tokens, each set comprising two or more game tokens and each set comprising one or more event tokens chosen from said plurality of event tokens;
   receive one or more images captured by said image capturing device;
   recognise one or more game tokens of the plurality of game tokens within the one or more images, the recognised one or more game tokens including one or more event token;
   responsive to recognising a single event token of the plurality of event tokens in the one or more images, cause the one or more individual game events associated with the recognised event token; and
   responsive to recognising one of the plurality of sets of game tokens in the one or more images, where the game tokens of the recognised set are positioned in a predetermined two-dimensional spatial configuration relative to each other, cause the one or more further game events associated with the recognised set, wherein the two or more game tokens can be detachably received by the support element in one or a limited number of predetermined two-dimensional spatial configurations relative to each other, such that the game tokens can only be so received.

2. The game system according to claim 1, wherein the processor is further configured, responsive to recognising two or more event tokens of the plurality of event tokens in the one or more images, where the recognised two or more event tokens are different from the plurality of sets of game tokens or where the recognised two or more event tokens are positioned in another spatial configuration relative to each other, different from said predetermined spatial configuration, to cause the one or more individual game events associated with the two or more recognised event tokens without causing any of the further game events.

3. The game system according to claim 1 wherein, each event token is indicative of an individual game asset; wherein each individual game event associated with an event token comprises making the individual game asset associated with said event token available in the digital game; and wherein a further game event associated with a set of game tokens comprises making another game asset available in the digital game, the another game asset being different from an accumulation of the individual game assets associated with the one or more event tokens of the set of game tokens.

4. The game system according claim 1 wherein, the digital game comprises computer executable code configured to cause the processor to control at least one virtual game item.

5. The game system according to claim 4:
   wherein each event token is indicative of an individual game asset attributable to the at least one virtual game item;
   wherein each individual game event comprises making a corresponding one of the individual game assets available to one or more of the at least one virtual game item; and
   wherein a further game event associated with a set of two or more event tokens comprises making another game asset available to one or more of the at least one virtual game item, the another game asset being different from an accumulation of the individual game assets associated with the event tokens of said set.

6. The game system according to claim 4, wherein the game system further comprises an item token representing a first virtual game item of the at least one virtual game item; and wherein a first set of game tokens is associated with a first further game event, the first set comprising the item token and one or more event tokens; and
   wherein the first further game event comprises associating one or more game event associated with the one or more event tokens of the first set with the first virtual game item of the first set.

7. The game system according to claim 1, wherein each event token carries a visually recognisable marker identifying the individual game event associated with the event token.

8. The game system according to claim 1, wherein the one or more coupling members are operable for receiving tokens in predetermined respective positions and orientations relative to the support element such that the two or more game tokens can only be detachably received by the support element in said predetermined spatial configuration relative to each other.

9. The game system according to claim 1, wherein the processor is further configured to recognise the support element in the one or more images and to only cause the one or more further game events associated with a recognised set when the event tokens of the recognised set are positioned in said predetermined spatial configuration relative to each other and when the processor has recognised the support element.

10. The game system according to claim 1, wherein the image capturing device and the processor are integrated into a single device.

11. The game system claim 1, wherein the game tokens are tiles connectable to a support plate.

12. The game system according to claim 11; wherein the relative orientation of two or more tiles to each other is predetermined from the one or more images.

13. The game system according to claim 1, wherein the predetermined spatial configuration is defined completely or in part by predetermined relative positions and orientations of the event tokens within the one or more images.

14. A method, implemented by a processor, of operating a game system, the game system comprising a plurality of game tokens, an image capturing device, a support element, and the processor; the image capturing device being operable to capture one or more images of one or more game tokens placed within a field of view of the image capturing device, the plurality of game tokens comprising a plurality of event tokens, wherein the method comprises:
   executing a digital game, the digital game comprising computer executable code configured to cause the processor to associate one or more individual game events with each of the plurality of event tokens; and to associate one or more further game events with each of a plurality of sets of game tokens, each set comprising two or more game tokens and each set comprising one or more event tokens chosen from said plurality of event tokens;

receiving one or more images captured by said image capturing device;

recognising one or more game tokens of the plurality of game tokens within the one or more images, the recognised one or more game tokens including one or more event token;

responsive to recognising a single event token of the plurality of event tokens in the one or more images, causing the one or more individual game events associated with the recognised event token; and responsive to recognising one of the plurality of sets of game tokens in the one or more images, where the game tokens of the recognised set are positioned in a predetermined two-dimensional spatial configuration relative to each other, causing the one or more further game events associated with the recognised set, wherein the two or more game tokens can be detachably received by the support element in one or a limited number of predetermined two-dimensional spatial configurations relative to each other, such that the game tokens can only be so received.

15. The processing device configured to perform the method defined in claim 14.

16. A computer program product comprising program code adapted to cause, when executed by a processing device, the processing device to perform the method defined in claim 14.

17. A kit of parts, comprising a plurality of event tokens and instructions to obtain a computer program as defined in claim 16 and to execute the obtained computer program on a processing device.

* * * * *